United States Patent [19]

Zeltner et al.

[11] Patent Number: 5,237,039
[45] Date of Patent: Aug. 17, 1993

[54] PREPARATION OF POLYPHENYLENE ETHERS IN THE PRESENCE OF DEFOAMER

[75] Inventors: Doris Zeltner, Roemerberg; Peter Steieri, Ludwigshafen; Heike Feldman, Mannheim; Klaus Muehlbach, Gruenstadt; Carola Hedtmann-Rein; Bernhard Czauderna, both of Hirschberg; Karl Hennig, Hessheim, all of Fed. Rep. of Germany

[73] Assignee: BASF Aktiengesellschaft, Ludwigshafen, Fed. Rep. of Germany

[21] Appl. No.: 876,163

[22] Filed: Apr. 30, 1992

[30] Foreign Application Priority Data

May 2, 1991 [DE] Fed. Rep. of Germany ....... 4114247

[51] Int. Cl.$^5$ ............................................. C08G 65/44
[52] U.S. Cl. ................................... 528/214; 528/212; 528/215
[58] Field of Search ......................... 528/214, 215, 212

[56] References Cited

U.S. PATENT DOCUMENTS 4,396,757 8/1983 Ragimov et al. .................... 528/214

OTHER PUBLICATIONS

Foam Control Agents, Kerner, Chem. Technol. Rev. No. 75, Noyes Data Corp. Park Ridge (1976), pp. vii--xii.
Ullman's Encyclopedia of Industrial Chemistry, 5th Ed. vol. Ai-366-372 p. 466.
P. G. Pape, J. Petrochem. Techn. 1197 (1983).

Primary Examiner—Harold D. Anderson
Attorney, Agent, or Firm—Keil & Weinkauf

[57] ABSTRACT

Polyphenylene ethers are prepared from monohydric phenols by oxidative coupling with oxygen-containing gases in the presence of an oxidation catalyst in an organic solvent by carrying out the polycondensation in the presence of a defoamer.

10 Claims, No Drawings

PREPARATION OF POLYPHENYLENE ETHERS IN THE PRESENCE OF DEFOAMER

The present invention relates to an improved process for preparing polyphenylene ethers from monohydric phenols by oxidative coupling with oxygen-containing gases in the presence of an oxidation catalyst in an organic solvent.

Polyphenylene ethers and processes for preparing them are known per se and described in numerous publications, for example U.S. Pat. Nos. 3,306,874, 3,306,875, 3,642,699, 3,914,266, DE-A-20 11 709, DE-A-22 28 071, DE-A-24 60 326, DE-A-27 38 889 or EP-A-111 722, and M. Bartmann et al., Makromol. Chem. 189, (1988), 2285-92.

The processes used for preparing polyphenylene ethers are predominantly based on the self-condensation of a monohydric phenol in the presence of an oxygen-containing gas and a catalyst. For a process to be commercially useful it is desirable for the starting materials to be quickly converted into pure product. However, the rate at which the reaction takes place cannot be speeded up ad infinitum by raising the reaction temperature or increasing the gas supply, since this results in technical problems and in the increased formation of by-products that discolor the polyphenylene ethers.

It is an object of the present invention to shorten the reaction time compared with existing processes and at the same time to improve the color quality of the product.

We have found that this object is achieved by a process for preparing polyphenylene ethers from monohydric phenols by oxidative coupling with oxygen-containing gases in the presence of an oxidation catalyst in an organic solvent, which comprises carrying out the polycondensation in the presence of a defoamer.

Different defoamer systems have been developed for numerous fields of application, as is evident from the literature (for example Ullmann's Encyclopedia of Technical Chemistry, 5th Ed., Verlag Chemie, Weinheim (1988), Vol. A8, p. 366 ff., Vol. A11, p. 466 ff.; P. G. Pape: J. Petrochem. Techn. 1197 (1983); H. T. Kerner: Foam Control Agents, Chem. Technol. Rev. No. 75, Noyes Data Corporation, Park Ridge (1976)).

Defoamers suitable for the process of the invention are oily compounds that are insoluble in the solvents in which the particular reaction is carried out and are liquid at the particular reaction temperature. It is also possible for emulsions of the oily compounds in water, another polar medium or a mixture of a polar liquid with water to have a defoaming effect. Of similar advantage are defoamers based on suspensions in the oily compound of a particulate solid which is inert under the reaction conditions and also suspensions that additionally contain water, another polar medium or a mixture of a polar liquid with water. It is also possible to use solid defoamer formulations which release the active defoamer only on addition to the reaction mixture.

The oily compounds include hydrocarbon oils such as naphthenic and paraffinic mineral oils but also paraffinic hydrocarbon waxes, fatty alcohols, fatty esters of mono- or polyfunctional alcohols and also fatty amides and sulfonamides.

Preferred oily defoamer components are organopoly-siloxanes. These are for example alkyl-, alkoxy-, aryl-, aralkyl- and aryloxy-polysiloxanes and also alicyclic polysiloxanes. Typical examples of alkyl-polysiloxanes are dimethyl-, diethyl-, dipropyl- and methyl-butyl-polysiloxanes. The alkyl moieties can be linear or branched. Similarly, they can be substituted by halogen atoms. For instance, polysiloxanes with chloroethyl, chloropropyl and chlorobutyl moieties can be used. It is also possible to use fluorinated organopolysiloxanes. This group includes perfluoroalkylpolysiloxanes, for example poly(methyl-3,3,3-trifluoropropyl)-siloxane and poly(methyl-3,3,4,4,4-pentafluorobutyl)-siloxane. The aryl, aralkyl and aryloxy radicals which may be substituents on the siloxanes include phenyl, chlorophenyl, biphenyl, naphthyl, tolyl, ethylphenyl, propylphenyl and phenyloxy. Suitable alkoxy radicals include in particular methoxy, ethoxy, propoxy, butoxy, pentoxy and hexoxy, which may be linear or branched. The alicyclic rings are in particular 5- or 6-membered and may be either unsubstituted or alkyl- or halogen-substituted. It is also possible to use polysiloxanes that carry cyano or aldehyde groups, such as cyanoalkylpolysiloxanes, for example poly(cyanomethyl)methylsiloxane, poly(2-cyanoethyl)methylsiloxane, poly(3-cyanopropyl)methylsiloxane, poly(4-cyanobutyl)methylsiloxane, poly(5-cyanopentyl)methylsiloxane, poly(cyanomethyl)ethylsiloxane and poly(2-cyanoethyl)ethylsiloxane.

It is also possible to use copolymers of various organopolysiloxanes, including those formed from non-fluorinated organopolysiloxanes with perfluoroalkylpolysiloxanes. It is similarly possible to use copolymers of an organopolysiloxane with other polymers, and for example alkylpolysiloxane-polyoxyalkylene block polymers or copolymers of alkylpolysiloxanes and fluorinated polyolefins.

Particularly suitable for the purposes of the present invention are alkylpolysiloxanes and fluorinated organopolysiloxanes. Of particular advantage are dimethylpolysiloxanes and also fluorinated organopolysiloxanes.

Mixtures of two or more oily compounds, for example a mineral oil and an organopolysiloxane, can likewise be used as the oily component of the defoamer.

The viscosities of the oily compounds are not critical, judging by experience to date. They may vary within the range from 5 to 100,000 $mm^2$/s at 25° C. and within the range from 15 to 70 $m^2$/s at the temperatures at which the oily compounds are to be effective.

The oily compounds can be used as defoamers also in the form of emulsions in water or another polar medium, including water-containing polar liquids. The external (coherent) phase advantageously comprises aliphatic hydrocarbons having polar functional groups, for example esters or ketones, chlorinated hydrocarbons such as 1,1,1-trichloroethane or alcohols such as glycol.

Suitable emulsifiers are ethoxylated fatty alcohols, fatty acids, hydrogenated fatty acid triglycerides and glycerol monoesters with fatty acids. Preference is given to sorbitol oil and sorbitan esters. It is particularly advantageous to use nonylphenyl, oleyl and stearyl polyglycol ethers.

According to the invention, the defoamers may contain a particulate solid that is inert under the reaction conditions. In general, such solids have a particle size of 5-100 μm (longest diameter) and a surface area of 50-400 $m^2$/g. Any mineral that is customarily used as a filler in foamer formulations can also be used in the process of the invention. This includes aluminum oxide, titanium dioxide, silica, perlite and clays; however, preference is given to synthetic silicas as obtainable, for example, by flame hydrolysis of SiCl$_4$ or by precipitating water-soluble silica with dimethyldichlorosilane (precipitated silica).

Advantageously, the minerals are hydrophobicized, i.e. rendered hydrophobic, by known methods either by pretreatment or in situ. In such pretreatments the minerals are treated with organic compounds or silicone reagents which contain at least one of the following functional groups: —OH, —NH$_2$, —SH, —NHR, —NH$_2$, —NH$_3$ or —NR$_4$, capable of reaction with the acidic centers on the mineral surface. Typical reagents include disilazanes or silanes, such as hexamethyldisilazane, trichlorooctadecylsilane or chlorotrimethylsilane, the silanes being convertible, for example by hydrolysis, into hydroxides. It is also possible to use primary, secondary and quaternary alkylamines and alkyl-etheramines. Silicas are customarily hydrophobicized by vigorously agitating the particles in the hydrophobicizing reagent, if desired in the presence of a solvent, and then drying them. Hydrophobicization in situ generally comprises preparing defoamers on a silicone oil-silica basis by heating a dispersion of hydrophilic silica particles in organopolysiloxane with intensive stirring. If desired, basic catalysts such as alkali or alkaline earth metal hydroxides and also, preferably, alkali metal siloxides, may be included (H. Ferch et al., Schriftenreihe Pigmente-Degussa, Part 42 (1987)).

Suitable solid defoamer ingredients also include hydrophobic materials such as polyethylene of low molecular weight, polyesters and amides of long-chain fatty acids.

The defoamers may contain not only solids made of one component but also solids made of mixtures of different materials. Typically, the solids content of the defoamer will be within the range of 1 to 40% by weight, based on the total weight of the defoamer.

The process of the invention works particularly well with defoamers which comprise a dispersion of a dimethylpolysiloxane or of a fluorinated organopolysiloxane in water or another polar medium and contain from 0 to 40% by weight, based on the total weight of the defoamer, of synthetic silica and also a polyglycol ether as preferred emulsifier.

The defoamers also contain from 0 to 5% by weight of a tertiary amine such as triethanolamine. It is particularly advantageous to use from 0.001 to 1% by weight, based on the total reaction mass, of defoamer.

To prepare the polyphenylene ethers it is particularly advantageous to use those monohydric phenols that have substituents in both the ortho positions. The phenols may additionally have a substituent in the meta position.

Examples of substituents are halogen atoms such as chlorine and bromine and alkyl radicals of from 1 to 4 carbon atoms which preferably carry no α-disposed tertiary hydrogen atom, for example methyl, ethyl, propyl or butyl. The alkyl radicals may in turn be substituted by halogen atoms such as chlorine or bromine or by hydroxyl. Further examples of possible substituents are alkoxy radicals, preferably of up to 4 carbon atoms, and phenyl radicals, which if desired may be substituted by halogen atoms and/or alkyl groups. It is also possible to employ mixtures of different phenols, for example mixtures of 2,6-dimethylphenol and 2,3,6-trimethylphenol, in which case the corresponding copolymers are obtained.

Examples of highly suitable phenols are 2,6-dimethyloxyphenol, 2,6-diethoxyphenol, 2-ethoxy-6-methoxyphenol, 2,6-dichlorophenol, 2-methyl-6-phenylphenol and 2,6-diphenylphenol.

Preference is given to using phenols where the substituents are alkyl radicals, in particular $C_1$-$C_4$-alkyl radicals, such as 2,6-dimethylphenol, 2,6-diethylphenol, 2-ethyl-6-methylphenol, 2-methyl-6-propylphenol, 2,6-dipropylphenol and 2-ethyl-6-propylphenol.

A particular preference is given to a 2,6-dimethylphenol that has been separated by the methods described in the literature (cf. Houben-Weyl-Müller, Methoden der organischen Chemie, Phenole, Part 2, Volume 611 C, Georg-Thieme Verlag, Stuttgart, 1976, pp. 1187 et seq. and the references cited therein) from those phenols which interfere with the polymerization, such as unsubstituted phenol, o-cresol, p-cresol, m-cresol and polycyclic phenols, such as 2,6-dimethyl-1-hydroxybiphenyl.

The high molecular weight polyphenylene ethers prepared from the monohydric phenols by the defined process have in general molecular weights $\overline{M}_w$ of from 15,000 to 90,000, preferably from 20,000 to 60,000.

To carry out the polycondensation, it is customary to introduce oxygen-containing gases, such as air or oxygen, into the 10°-60° C., preferably 20°-50° C., solution of the monomers in the presence of an oxidation catalyst. The oxygen flow rate is from 1 to 15 m$^3$/h, preferably from 3 to 10 m$^3$/h.

The oxidation catalysts known for polycondensation comprise systems of a metal and an organic compound, for example combinations of a metal and alcoholates, phenolates, amidines or amines. Preference is given to using combinations of amines and a copper salt.

The primary, secondary or tertiary amine component of the catalyst complex corresponds to those described in the aforementioned patents. Typical representatives are aliphatic amines in which the aliphatic group comprises straight-chain or branched hydrocarbons or cycloaliphatic hydrocarbons. Preference is given to aliphatic monoamines. Particular preference is given to mono-, di- and trialkylamines in which the alkyl groups have from 1 to 12 carbon atoms. It is typically possible to use mono-, di- and trimethyl-, -ethyl-, -n-propyl-, -isopropyl-, -n-butyl-substituted amines, mono- and dicyclohexylamine, ethylmethylamine, morpholine and N- alkyl-cycloaliphatic amines such as N-methylcyclohexylamine. It is also possible to use cyclic tertiary nitrogen bases, such as pyridine, alphacollidine and gamma-picoline.

Mixtures of such primary, secondary and tertiary amines may likewise be used, if desired. A particularly preferred monoalkylamine is n-butylamine; a particularly preferred dialkylamine is di-n-butylamine; and a particularly preferred trialkylamine is triethylamine. A preferred cyclic tertiary nitrogen base is pyridine.

Particularly preferred mixtures contain N,N'-di-t-butylethylenediamine and di-n-butylamine. The concentration of the primary and secondary amine in the reaction mixture can vary within wide limits. However, preference is given to low concentrations. The range extends from about 1 to 40 mol %, based on the phenol used. Preference is given to using from 15 to 35 mol %, based on the phenol used. In the case of a tertiary amine the preferred range is significantly higher and extends from about 500 to 1500 mol per 100 mol of the monohydric phenol.

Typical examples of copper(I) salts and copper(II) salts which are suitable for the process are found in the aforementioned patents. They include copper(I) chloride, copper(II) bromide, copper(II) sulfate, copper(II) azide, copper(II) tetraminesulfate, copper(II) acetate, copper(II) butyrate and copper(II) toluate. Preferred copper(I) and copper(II) salts are the halides, alkanoates or sulfates, for example copper(I) bromide and copper(I) chloride or copper(II) acetate. In the case of primary and secondary amines the concentration of the copper salts is advantageously kept low. The concentrations range from about 0.1 to 0.9 mol, preferably from 0.4 to 0.6 mol, per 100 mol of monomer. In the case of tertiary amines the copper salt is preferably used in an amount of about 5-15 mol per 100 mol of monohydric phenol.

Solvents suitable for the process are $C_6$-$C_{10}$-hydrocarbons such as ethylbenzene, xylene, diethylbenzene and mixtures thereof, preference being given to ethylbenzene or toluene. Usually the weight ratio of solvent to monomer lies within the range from 1:1 to 10:1. Weight ratios of less than 1:1 are less advisable, and those greater than 20:1 do not in general yield any significant benefits.

If desired, an activator such as a diarylamidine or a diarylformamidine may be added to the reaction mixture (see U.S. Pat. No. 3,554,515).

The polycondensation can be carried out not only continuously but also batchwise.

In a particularly advantageous form of the reaction, the reactor is charged first with the oxidation catalyst and the defoamer in the organic solvent. Then the monomer, or a solution of the monomer in an organic solvent, is added together with the oxygen-containing gas.

Once the desired molecular weight is reached, the reaction solution can be treated with complexing compounds such as the sodium salts of ethylenediaminetetraacetic acid, of nitrilotriacetic acid or of other polyaminocarboxylic acids in order to remove the metal ions of the oxidation catalyst. Neither the nature of the complexing agent nor its manner of addition are critical. For instance, the complexing compounds can be added not only without a solvent but also in aqueous solution in the form of their alkali metal or alkaline earth metal salts. Addition can take place all at once or in multiple portions, continuously or batchwise, with or without additional water. The metal component is removed by phase separation.

The contact time between the complexing agent and polyphenylene ether phase can vary very widely depending on the system. Preference is given to reaction times of from 1 minute to 5 hours. Frequently, a reaction time of from 5 to 30 minutes will be sufficient. The preferred reaction temperature is within the range from 25° to 80° C., but it is also possible to employ higher or lower ranges, from about 20° C. to about 90° C.

After the removal of the metallic components in the form of their complexes, the polyphenylene ether can be isolated from the solution by the methods described in the aforementioned US patents. For instance, the polyphenylene ether can be isolated by precipitating it from the reaction solution by means of an excess of an alcohol, for example methanol. However, it is preferable to remove the solvent by repeated evaporation at elevated temperature and reduced pressure.

If the oxidation catalyst contains an amine component, the latter can be recovered by distillation or in another conventional manner.

The polyphenylene ethers prepared by the process of the invention can be conventionally processed, for example into films, strips, fibers or molded pieces, and accordingly be employed for all the purposes which are also described in the aforementioned patent specifications. They can be mixed with various fillers, reinforcing agents, stabilizers, plasticizers and the like. If desired, they can be colored with dyes or pigments. It is also possible to use the polyphenylene ethers prepared according to the invention to prepare mixtures with other polymers, in particular polystyrene, preferably high impact polystyrene, mixtures of this type being known for example from U.S. Pat. No. 3,383,435 and DE-C3-22 11 005. Mixtures of preferably impact modified products of the process and polyamides, which may likewise be impact modified, have good mechanical properties (cf. EP-B1-46 040, EP-A1-236 593, WO 86/2086, WO 87/540).

The process of the invention gives high molecular weight polyphenylene ethers within shorter reaction times. The process of the invention also has the advantage that the products are naturally very light-colored. Accordingly, mixtures thereof with other polymers have a significantly lighter color than mixtures containing polyphenylene ethers prepared by conventional methods.

EXAMPLES

I) Preparation of polyphenylene ethers

A 1200 l stirred kettle was charged with 780 kg of toluene and oxidation catalyst A or B and also 12 kg of defoamer (a) or (b). 154.4 kg of 2,6-dimethylphenol were added at a rate of 44.1 kg/h under oxygenation in the course of 210 minutes, while the reaction solution was thoroughly mixed.

The reaction temperature was 35° C. and the oxygen flow rate was 4 $m^3$h. The particular reaction times are shown in Table 1.

After the polycondensation had ended, the reaction mixture was extracted twice with 72 kg of a 10% aqueous disodium ethyleneaminetetraacetate solution and 32 kg of water at from 70° to 80° C. The aqueous phase was then separated off and the solvent was removed by evaporation.

Oxidation catalysts

A)
  0.95 kg of copper(I) bromide
  43.35 kg of toluene
  52.20 kg of di-n-butylamine
B)
  0.95 kg of copper(I) bromide
  43.35 kg of toluene
  52.20 kg of di-n-butylamine
  0.60 kg of N,N'-di-t-butylethylenediamine Defoamers a)
  87.5% by weight of naphthenic mineral oil
  1.6% by weight of polydimethylsiloxane
  6.8% by weight of finely divided silica
  1.6% by weight of triethanolamine
b)
  75.0% by weight of fluorinated polysiloxane
  21.7% by weight of finely divided silica
  3.3% by weight of oleyl polyglycol ether

TABLE 1

| Ex. | Catalyst | Defoamer content [% by weight] a) | b) | Reaction time [min] | Viscosity index eta [dl/g] |
|---|---|---|---|---|---|
| 1C[a)] | A | — | — | 270 | 0.41 |
| 1 |   | 0.09 |   | 270 | 0.45 |
| C[a)] | B | — | — | 240 | 0.37 |
| 2 |   | 0.09 |   | 230 | 0.42 |
| 3 |   |   | 0.09 | 230 | 0.41 |
| 4 |   | 0.9 |   | 225 | 0.47 |
| 5 |   |   | 0.9 | 225 | 0.48 |

[a)]for comparison

As can be seen from the table, the viscosity (determined by means of an Uebbelode viscometer at 25° C. on a 1% solution in chloroform) and hence the molecular weight increase for the same reaction time.

II) Color qualities

Preparation of polymer mixtures

The respective components were intensively mixed at 280° C. in a twin-screw extruder. The mixtures were injection molded at 280° C. into 60 mm roundels, on which the color quality was determined by reflectance measurement (to DIN 6164).

II.1) Polystyrene-polyphenylene ether mixtures

Components

| PPE: | Polyphenylene ether 1C or 4 (see TABLE 1) |
|---|---|
| HIPS: | Commercial high impact polystyrene, with 7.9% by weight of polybutadiene, average particle size of the rubber phase: 5-6 μm |

Impact modifier

Three-block rubber with styrene end blocks and an elastomeric center block comprising hydrogenated polybutadiene, styrene content 28% by weight White pigment: titanium dioxide

TABLE 2

| Ex. | PPE | HIPS [parts by wt.] | Impact modifier [parts by wt.] | White pigment [parts by wt.] | Reflectance [%] |
|---|---|---|---|---|---|
| 6C | 1C | 50 | 50 | 3 | 5 | 62 |
| 6 | 4 | 50 | 50 | 3 | 5 | 68 |
| 7C | 1C | 60 | 40 | — | — | 53 |
| 7 | 4 | 60 | 40 | — | — | 60 |

II.2) Polyamide-polyphenylene ether mixtures

Components

PPE: Polyphenylene ether 1C* or 4* * modified for improved interphase adhesion as follows: 99% by weight of polyphenylene ether and 1% by weight of maleic anhydride were thoroughly mixed in the melt at 290° C. in a twin-screw extruder. The melt was strand extruded, cooled in a waterbath and granulated.

Polyamide PA(1)

Nylon 66 having a viscosity number of 143 cm³/g (to DIN as 10.5% solution in concentrated H₂SO₄)

Polyamide PA(2)

Nylon 6 having a viscosity number of 150 cm³/g (to DIN as 10.5% solution in concentrated H₂SO₄)

Impact modifier

Three-block rubber with styrene end blocks and an elastomeric center block comprising hydrogenated polybutadiene, styrene content 28% by weight White pigment: titanium dioxide

TABLE 3

| Ex. | PPE | PA [parts by wt.] | Impact modifier [parts by wt.] | White pigment [parts by wt.] | Reflectance [%] |
|---|---|---|---|---|---|
| 8C | 1C* | 44 PA(1) 44 | 12 | 2 | 39 |
| 8 | 4* | 44 PA(1) 44 | 12 | 2 | 48 |
| 9C | 1C* | 50 PA(2) 40 | 10 | 2 | 37 |
| 9 | 4* | 45 PA(2) 40 | 10 | 2 | 45 |

We claim:

1. A process comprising preparing polyphenylene ethers from monohydric phenols by oxidative coupling with oxygen-containing gases in the presence of an oxidation catalyst in an organic solvent, and an effective amount of a defoamer, said defoamer being an oily compound which is liquid at the particular reaction temperature and is insoluble in the organic solvent.

2. The process of claim 1, wherein the defoamer is present in a proportion of about 0.001 to about 1% by weight based on the weight of the total reaction.

3. The process of claim 1, wherein the defoamer contains a particulate solid that is inert under the reaction conditions.

4. The process of claim 1, wherein the defoamer is in the form of an aqueous dispersion.

5. The process of claim 1, wherein the defoamer is a dispersion in a polar organic medium.

6. The process of claim 1, wherein the oily compound is an organopolysiloxane.

7. The process of claim 1, wherein the organopolysiloxane is a polydimethylsiloxane.

8. The process of claim 1, wherein the organopolysiloxane is a fluorinated organopolysiloxane.

9. The process of claim 1, wherein the oily compound is a mineral oil.

10. The process of claim 3, wherein the solid is synthetic hydrophobicized silica.

* * * * *